United States Patent [19]

Bak

[11] 3,994,992

[45] Nov. 30, 1976

[54] BIAXIALLY ORIENTED POLYMERIC SHEET HAVING ATTENUATED BLOCKING TENDENCIES AND A METHOD OF ATTENUATING

[75] Inventor: Bruce S. Bak, Longmeadow, Mass.

[73] Assignee: Monsanto Company, St. Louis, Mo.

[22] Filed: Oct. 29, 1973

[21] Appl. No.: 410,647

[52] U.S. Cl. .......................... 260/876 R; 260/880 R
[51] Int. Cl.² ................... C08L 51/00; C08L 53/00
[58] Field of Search ..................... 260/876 R, 880 R

[56] References Cited
UNITED STATES PATENTS

| | | | |
|---|---|---|---|
| 2,802,808 | 8/1957 | Hayes | 260/45.5 |
| 3,451,538 | 6/1969 | Trementozzi | 206/46 |
| 3,515,774 | 6/1970 | Lee | 260/880 |
| 3,607,978 | 9/1971 | Lee et al. | 260/876 R |
| 3,615,710 | 10/1971 | Lee et al. | 99/171 LP |
| 3,720,340 | 3/1973 | Lee et al. | 260/876 R |

*Primary Examiner*—Richard B. Turer
*Attorney, Agent, or Firm*—Joseph S. Nelson; William J. Farrington; James C. Logomasini

[57] ABSTRACT

The present invention relates to a biaxially oriented polymeric sheet having attenuated blocking properties comprising, a polymer of polyvinylidene aromatic monomer and optionally 0.1–80% of an unsaturated ethylenically unsaturated nitrile having dispersed therein an amount, sufficient to attenuate the blocking, of a diene rubber grafted with said monomers and a method for attenuating the blocking properties of said sheet.

31 Claims, No Drawings

BIAXIALLY ORIENTED POLYMERIC SHEET HAVING ATTENUATED BLOCKING TENDENCIES AND A METHOD OF ATTENUATING

BACKGROUND OF THE INVENTION

This invention relates to a biaxially oriented polymeric sheet having attenuated blocking properties and a method for attenuating the blocking properties of biaxially oriented polymeric sheet.

It is well known that biaxially oriented sheeting manufactured from polymeric materials has the tendency to block or adhere to itself in rolls or when stacked in sheets. Certain polymers, such as those of the styrene family of plastics, have to be biaxially oriented in sheet form so as to develop the necessary toughness for most practical uses having high utility. The process of orientation wherein a material is extruded into a thick sheet and then stretched biaxially to 1 to 30 mils has a tendency to glaze the surface of the sheet giving it a high gloss and good see-through properties. However, the extreme smoothness of the sheet allows the sheeting to contact itself very intimately promoting coherence and blocking.

The problem of blocking in biaxially oriented polymeric sheeting, particularly in the range of thickness of 1 to 30 mils, is a very serious problem. Rolls block and are difficult to unroll by the fabricator. Stacked sheets adhere to each other and will not feed well into fabricating equipment. Finished articles formed from the sheet, e.g. lids, dishes, etc., will not disengage readily in automatic vending machines.

A great number of additives have been used in sheet compositions to overcome blocking such as waxes, oils, lubricants, plasticizers, etc., which can migrate to the surface of the sheet and reduce the coherence of the sheet to itself. Such materials have not been entirely satisfactory and have presented problems in that such additives can produce haze or are temporary in nature. Further, being on the surface, such additives and coatings can produce problems in treating the fabricated sheet such as printing, labeling, sealing, etc.

Many methods have been proposed to prevent blocking, none of which is entirely satisfactory. External methods such as applying coatings of waxes, oils and lubricants have been used. Such materials have been coated during sheet production operations but are often only temporary in their effect as they can migrate into the sheet or be removed in fabrication. External treatment requires additional manufacturing steps creating cost and quality control problems. As discussed, such treatment can create problems in subsequent fabrication, e.g. printing, heat sealing, etc.

In accordance with the present invention, it has been found that the blocking of biaxially oriented polymeric sheeting can be attenuated, particularly those of polyvinylidene aromatic polymers or copolymers, by incorporating a grafted diene rubber in such polymers. These grafted diene rubbers were dispersed substantially throughout the polymer have been found to attenuate the blocking properties of said sheeting on a permanent basis for the service life of the sheeting. Such grafted diene rubbers do not migrate out of the sheet nor are they removed by exposure to water or other fabricating means.

Such grafted diene rubbers when incorporated in the sheeting do not create a haze problem or subsequent fabricating problems for the sheeting. Finally, such grafted diene rubbers can be readily dispersed in the polymeric material and formed into a biaxially oriented sheet by simple processing means requiring a minimum of processing steps giving a sheeting having great utility.

SUMMARY OF THE INVENTION

The present invention relates to:
A biaxially oriented polymeric sheet having attenuated blocking properties comprising:
  A. a polymer selected from the group consisting of:
    1. a polymer of at least one monovinylidene aromatic monomer and
    2. a copolymer of said monovinylidene aromatic monomer and an ethylenically unsaturated nitrile monomer wherein said nitrile monomer constitutes from about 0.1 to 80% by weight of said copolymer, said polymer having dispersed therein an amount, sufficient to attenuate the blocking properties of said sheet of:
  B. a diene rubber, said rubber being grafted with a polymer selected from the group consisting of:
    1. a polymer of at least one monovinylidene aromatic monomer and
    2. a copolymer of said monovinylidene aromatic monomer and an ethylenically unsaturated nitrile monomer wherein said nitrile monomer constitutes from about 0.1 to 80% by weight of said copolymer.

The present invention also relates to an improved method for attenuating the blocking properties of a biaxially oriented polymeric sheet comprising dispersing a diene rubber, grafted with at least one monovinylidene aromatic monomer and optionally at least one ethylenically unsaturated nitrile monomer wherein said nitrile monomer moiety constitutes from about 0.1 to 80% by weight of the total monomer grafted, in a polymer of at least one monovinylidene aromatic monomer and optionally an ethylenically unsaturated nitrile monomer wherein said nitrile monomer moiety constitutes of from about 0.1 to 80% of said polymer and forming a sheet, said grafted diene ribber being used in an amount sufficient to attenuate the blocking properties of said sheet.

DESCRIPTION OF THE PREFERRED EMBODIMENTS

The polymer of at least one monovinylidene aromatic monomer and optionally an ethylenically unsaturated nitrile monomer wherein said unsaturated nitrile monomer moiety comprises of from 0.1–80% by weight of said polymers includes monovinylidene aromatic monomers such as styrene, aralkylstyrenes, e.g. o-, m-, and p-methylstyrenes, -ethylstyrenes, -isopropylstyrenes, -butylstyrenes, -tertiary butylstyrenes, various alphalkylstyrenes, e.g. methylstyrenes, ethylstyrenes, various arhalostyrenes, e.g. o-, m-, and p-chlorostyrenes, bromostyrenes, fluorostyrenes; various di, tri, tetra and penta substituted chlorostyrenes, bromostyrenes and fluorostyrenes and various alpha-and beta-halosubstituted styrenes, e.g. alpha-chlorostyrenes, alphabromostyrenes, beta-chlorostyrenes and beta-bromostyrenes.

The ethylenically unsaturated nitrile monomers used in the polymers of this invention are e.g. acrylonitrile, methacrylonitrile, ethacrylonitrile, methyl methacrylonitrile and the like with acrylonitrile and methacrylonitrile being preferred.

Either the vinylidene aromatic monomer or the ethylenically unsaturated nitrile monomer can be used in major proportions relative to one another in copolymerization or grafting. For example, styrene and acrylonitrile will copolymerize with the preferred ratio of styrene to acrylonitrile (S/AN) being about 75% S to 25% AN, the azeo-tropic mixture of the two, which gives a uniform copolymer. These ratios can be varied from 99/0.1 to 20/80, S/AN, with known polymerization methods to give polymers that have great utility.

In applications that need properties such as gas impermeability, light stability, toughness, etc., it is preferred to have the nitrile monomer present in grater proportions, e.g. up to 80 weight percent. For other applications where the fabricated part needs greater plasticity, composition containing a major portion of the monovinylidene aromatic monomer is preferred, e.g. up to 80 weight percent.

The polymers of this invention can have molecular weights in the range of 30,000 to 150,000 Staudinger, preferably 40,000 to 80,000 to give the sheet adequate toughness.

The diene rubbers of this invention (including mixtures of diene rubbers) can be any rubbery polymer (a rubbery polymer having a second order transition temperature not higher than 0° centigrade, preferably not higher than −20° centigrade, as determined by ASTM Test D-746-52T) of one or more of the conjugated, 1,3-dienes, e.g. butadiene, isoprene, 2-chloro-1,3 butadiene, 1 chloro-1,3 butadiene, piperylene, etc. Such rubbers include copolymers and block copolymers of conjugated 1,3-dienes with up to an equal amount by weight of one or more copolymerizable monoethylenically unsaturated monomers, such as monovinylidene aromatic hydrocarbons (e.g. styrene; an aralkylstyrene, such as the o-, m- and p-methylstyrenes, 2,4-dimethylstyrene, the arethylstyrenes, p-tert-butylstyrene, etc.; and alpha-methylstyrene, alphaethylstyrene, alpha-methyl-p-methyl styrene, etc.; vinyl naphthalene, etc.); arhalo monovinylidene aromatic hydrocarbons (e.g. the o-, m- and p-chlorostyrene, 2,4-dibromostyrene, 2-methyl - 4 - chlorostyrene, etc.); acrylonitrile; methacrylonitrile; alkyl acrylates (e.g. methyl acrylate, butyl acrylate, 2-ethylhexyl acrylate, etc.), the corresponding alkyl methacrylates; acrylamides (e.g. acrylamide, methacrylamide, N-butylacrylamide, etc.); unsaturated ketones (e.g. vinyl methyl ketone, methyl isopropenyl ketone, etc.); alpha-olefins (e.g. ethylene, propylene, etc.); pyridines; vinyl esters (e.g. vinyl acetate, vinyl stearate, etc.); vinyl and vinylidene halides (e.g. the vinyl and vinylidene chlorides and vinylidene chlorides and bromides, etc.); and the like.

Although the rubber may contain up to about 2.0 percent of a crosslinking agent, based on the weight of the rubber-forming monomer or monomers, crosslinking may present problems in dissolving the rubber in the monomers for the graft polymerization reaction. In addition, excessive crosslinking can result in loss of the rubbery characteristics.

A preferred group of rubbers are the stereospecific polybutadiene rubbers formed by the polymerization of 1,3 butadiene. These rubbers have a cis-isomer content of about 30–98% and a trans-isomer content of about 70–2% and generally contain at least about 85% of polybutadiene formed by 1,4 addition with no more than about 15% by 1,2 addition. Mooney viscosities of the rubber (ML-4, 212° F.) can range from about 20 to 70 with a second order transition temperature of from about −50° C. to −105° C. as determined by ASTM Test D-746-52T.

Diene rubbers grafted with monovinylidene aromatic monomers can be prepared by mass-suspension polymerization methods as disclosed in U.S. Pat. No. 3,488,743. Diene rubbers grafted with monovinylidene aromatic and ethylenically unsaturated monomers can be prepared according to methods disclosed in U.S. Pat. No. 3,509,237. The weight average particle size diameter of the rubber particle can range from 0.1 to 5.0 microns, preferably 1.0 to 3.0 microns. The weight average particle size diameter is measured with a photosedimentometer by the published procedure of Graves, M. J. et al., "Size Analysis of Subsieve Powders Using a Centrifugal Photosedimentometer," British Chemical Engineering 9:742–744 (1964). A Model 3000 Particle Size Analyzer from Martin Sweets Co., 3131 West Market Street, Louisville, Kentucky was used. The rubber is grafted with the monomers described and the grafted polymer preferably has the same monomer composition as the polymer into which the grafted rubber is dispersed. For example, if the biaxially oriented sheet polymer is polystyrene the diene rubber is preferably grafted with styrene forming polystyrene grafts. If the sheet polymer is a styrene-acrylonitrile (SAN) copolymer the rubber is preferably grafted with styrene (S) and acrylonitrile (AN) forming SAN copolymer grafts. The proportion of styrene to acrylonitrile used (S/AN) preferably is in the same ratio as that of the copolymer used in the sheet. These ratios can be varied, however the rubber graft has been found to be more compatible with the polymer giving less haze, if the graft has about the same composition of monomers grafted to the rubber.

Those skilled in the art are aware that if one dissolves a diene rubber in the described monomers, that during polymerization the rubber forms a separate rubber-monomer phase with the monomer and the polymer polymerized forms a polymer-monomer phase with the monomer. When the polymer-monomer phase becomes larger during polymerization then the rubber-monomer phase, inverts and disperses as rubber-monomer droplets in the polymer-monomer phase. As the polymerizing mixture is completely polymerized, either by mass or suspension polymerization, e.g. the rubber-monomer droplets polymerize to discrete rubber particles dispersed in the polymer phase forming a polyblend of grafted rubber particles in the polymer phase. The rubber particles are found to be grafted with polymer molecules and also contain occluded polymer of the described monomers.

It has been found possible to analyze the amount of total occluded polymer phase and grafted polymers. The final polymerized polyblend produce (1 gram) are dispersed in a 50/50 acetone/methyl ethyl ketone solvent (10 ml.) which dissolves the polymer phase matrix leaving the rubber phase dispersed. The rubber phase is separated from the dispersion by centrifuge as a gel and dried in a vacuum oven at 50° C. for 12 hours and weighed as a dry gel.

$$\frac{\text{Dry gel}}{\text{in Polyblend}} = \frac{\text{Weight of dry gel}}{\text{Weight of polyblend}} \times 100$$

$$\left.\begin{array}{c}\text{\% graft and}\\ \text{Occlusions}\\ \text{in Rubber}\end{array}\right\} = \frac{\text{\% dry gel} - \text{\% rubber}}{\text{Percent rubber*}} \times 100$$

*Percent rubber determined by infra-red spectrochemical analysis of the dry gel $$\left.\begin{array}{l}\text{Parts** by weight}\\\text{of graft polymer}\\\text{and occluded poly-}\\\text{mer per unit weight}\\\text{of rubber}\end{array}\right\} = \frac{\%\text{ dry gel} - \%\text{ rubber}}{\text{Percent rubber}}$$

**The present invention has present about 0.5 to 4 grams of occluded and grafted polymer per gram of diene rubber particle.

The amount of grafted and occluded polymer contained in the rubber particle can vary being present in said grafted diene rubber in an amount of from about 0.5 to 4.0 parts for each part of rubber, preferably from about 1.5 to 3.5 parts for each part of rubber.

The diene rubber having graft and occluded polymer is contained in a polyblend as it is normally produced. For example, if 5% by weight of a diene rubber is dissolved in styrene monomer and polymerized to completion one would have a polyblend of polystyrene having 5% rubber dispersed therein. Of the monomer polymerized 0.5 to 4.0 parts for each part of rubber would be found in the rubber particle phase, hence the grafted rubber phase would range from 7.5 weight percent to 25 weight percent of the polyblend with about 92.5 to 75 weight percent of being polystyrene. It has been found most practical to blend polyblends having about the same monomer composition as the polymer with the polymer to insure a homogeneous dispersion of the small amounts of rubber needed to attenuate the blocking of the formed sheet. For example, about 1 part of a polystyrene polyblend containing 5% rubber by weight can be blended with about 99 parts of polystyrene polymer dispersing the grafted diene rubber particles therein and providing the polymer with about 0.05 weight percent of a dispersed diene rubber moiety. Said rubber being grafted and having occlusions and graft polymer in an amount of from about 0.5 to 4.0 parts of polymer for each part of rubber. For the present invention then, the concentration of rubber dispersed, is based on weight percent of the diene rubber moiety of the grafted diene rubber contained in the polymer sheet. The amount of diene rubber used can be from about 0.03 to 0.18 weight percent preferably from about 0.05 to 0.15 weight percent based on the weight of the sheet to attenuate its blocking properties.

The attenuation of the blocking properties of the biaxially oriented sheet are determined by a simple "slip test" measurements on the sheet according to the following test. The equipment used includes (1) 9 × 12 inch clipboard, (2) 2⅞ × 2⅞ × ¼ inch steel sled having a polyurethane foam sheet of the same dimensions cemented thereto and (3) protractor (0°–90°). The procedure includes the following steps:
1. Attach protractor at one edge of a table or ¾ inch platform with 0° line ⅛ inch above table top.
2. Provide a stop to hold the bottom edge of the clipboard at the point of intersection between the 90° and 0° lines.
3. Cut two sheet samples from the roll to be tested. Cut sample No. 1, 8 × 10 inches with the 10 inch axis in the machine direction. Cut sample No. 2, 4 × 5 inches with the 5 inch axis in the machine direction.
4. Place sample No. 1 (8 × 10 inches) on the clipboard and under the clip with the 10 inch axis perpendicular to the clip.
5. Place sample No. 2 (4 × 5 inch) centered laterally over sample No. 1 near the clip, but not held by the clip, with the 5 inch axis perpendicular to the clip.
6. Place the sled foam down centrally and gently on the 4 × 5 inch sample and allow to stand 30 seconds.
7. After the 30 second dwell time, raise the clip end of the board steadily and gently at a slow rate until sheet sample No. 2 (4 × 5 inch) slips over sample No. 1. Record the angle where slippage began as read on the protractor and indicate whether slippage occurred between sheet samples 1 and 2.
8. Repeat steps 3 to 7 inclusive to obtain two more readings and average.

Low slip angles show that the sheet has low blocking properties. Sheet material having a dispersed rubber of the present invention will have slip angles from less than 40° preferably 20 to 30. Sheet materials not having a dispersed rubber present have angles ranging from 50° to 70° indicating high cohesion between the sheet interfaces and such sheets will block severely in roll or stacks.

The mechanism wherein the attenuation of blocking of biaxially oriented sheets is obtained by dispersing grafted diene rubber particles in the sheet is not completely understood. It is thought that the grafter rubber particles exist as a separate phase in the surface of the sheet and, hence, can reduce the cohesion of the polymeric phase to itself. In addition, beyond that, grafted rubber particles can contribute a minute surface roughness to the sheet that reduces the cohesion of sheet. It was completely unexpected that such small amounts of grafted diene rubber, when dispersed in a polymeric sheet could reduce the cohesion so effectively.

Biaxially oriented sheet of the present invention is used for packaging, glazing and photographic plates, e.g. and requires a low level of haze so that see-through properties are not impaired. As discussed, the diene rubber being grafted with polymers having substantially the same monomer composition as the sheet material have a high level of compatibility with the sheet, hence on dispersion in the sheet do not contribute a high level of haze. Haze values for the sheet of less than 10 preferably less than 6 for sheets having a gauge of 25 mil or less as measured ASTM Test Method D-1003-61 are found to have great utility.

The biaxially oriented sheet can be formed by apparatus and procedures as disclosed in U.S. Pat. No. 3,123,854. The orientation of polystyrene (atactic) polymeric sheet, e.g. can be carried out in the range of 230°–270° F., wherein the extruded sheet is stretched biaxially about 2.3–3.5 times normal in the machine and transverse planes. In general, the orientation of polymer sheeting is carried out at or above the glass transition temperature T(g) for the polymeric sheet being stretch oriented. This temperature is that temperature, which on ascendency, the polymeric sheet changes from a glassy to a rubber consistency.

The present invention can be used in conjunction with other expedients with which to facilitate stretch orientation and the retention of same. In particular, lateral pinch rolls can be positioned at the initiation and discharge ends of the apparatus, as well as cooling means adapted to cool the sheet gripping means. In addition, it may be desirable to include quenching means, or cooling section which is located downstream of the actual stretching means and into which the thermoplastic material is led after completion of the stretch orientation herein disclosed. Utilization of quenching or cooling is designed to insure retention of the stretch orientation after introduction of the same. Quenching of the member or sheet is preferably done immediately after orientation and while tension is maintained in the same.

The present invention is adapted for utilization broadly with thermoplastic planar members preferably those in sheet or film form. By the term sheet, it is intended to include materials having the configuration ordinarily so described as well as ribbons, tubes, and these can be in single or multiple ply.

The dispersing step of the present invention used to disperse the grafted diene rubber in the polymer can be carried out by many methods, such as mixing, extrusion, banburying, etc. Preferably the polymer in the form of pellets is dry blended with the grafted diene rubber polyblend in the form of pellets or crumb. The dry blending can be in various mechanical blenders such as a typical commercial conical blender and then melt colloided by extrusion at 425°–525° F. Such extruders can be single or multiscrew extruders preferably with a length to diameter ratio of 20 to 1 or greater having screws with increasing root diameter to insure pressure and mixing at pressures of 2000 psi or greater. Such extruders can feed a slot die under pressure forming a normal unoriented polymeric sheet which is cooled to temperature slightly above the Tg of polymer and stretch oriented as described. The forming step of the present invention then includes the slot die extrusion of the normal sheet followed by stretch orientation as described.

The polymers into which the grafted diene rubber is dispersed can also contain other materials such as dyes, plasticizers, lubricants and the like without adversely affecting the effectiveness of the grafted diene rubber in attenuating the blocking properties of the biaxially oriented sheet. These materials can be incorporated into the polymers during any stage of its preparation or by compounding with the polymer before the forming operation.

EXAMPLE 1

An admixture of 98.41 parts of polystyrene, 0.05 parts of zinc stearate, 0.04 parts of polyethylene glycol and 1.5 parts of a high impact polystyrene* containing 5.9% by weight rubber was mixed in a ribbon blender and extruded and biaxially stretched into a film of 2.75 mils having 0.088 weight percent diene rubber present at an extrusion temperature of 510° F. and extruder back pressure of 2800 PSI. The normal sheet was extruded at a gauge of about 16.5 mils and stretched biaxially about 3.0 times normal in the machine and transverse directions at about 250° F. and cooled giving a tough highly stressed sheet. The sheet produced under these conditions has a slip angle of 27°, a p.s.i. orientation stress level of 135 in the machine direction and a p.s.i. orientation stress level of 110 in the cross machine direction. The orientation stress level being determined according to ASTM-D-1054. The haze level was measured having a value of less than 1.

* The impact polystyrene contained about 94.1 weight percent of polystyrene and about 5.9 weight percent of a dispersed polybutadiene rubber, said rubber having a grafted and occluded polystyrene level of 2.5 parts polystyrene to 1 part of rubber and a dispersed weight average particle size diameter of about 2.2 microns. The polystyrene of the polyblend had an average molecular weight of about 47,000 Staudinger and the polystyrene blended with the polyblend had an average molecular weight of about 47,000 Staudinger. The butadiene rubber used in the polyblend has a Mooney viscosity of 50 (ML-4, 212° F.) and a cis-1,4 isomer content of about 35%, a trans 1-4 isomer content of about 55% and about 10% of vinyl 1,2 isomer content. The polyethylene glycol was obtained from the GAF Corporation, New York, N.Y., under the trade name PEG400.

EXAMPLES 2–10

The procedures and materials of Example 1 were used wherein biaxially oriented sheets were prepared having different levels of dispersed diene rubber to determine and compare the blocking properties of the sheet.

| Example | Wgt. % Polystyrene[1] | Wgt. % Polyblend | Wgt. % Rubber | Slip Angle | Gauge | Haze[2] |
|---|---|---|---|---|---|---|
| 2 | 99.5 | 0.5 | 0.030 | 40 | 2.75 | 1.2 |
| 3 | 99.0 | 1.0 | 0.059 | 30 | 2.75 | 3.1 |
| 4 | 98.5 | 1.5 | 0.089 | 26 | 2.75 | 4.7 |
| 5 | 99.0 | 1.0 | 0.059 | 28 | 4.75 | 3.2 |
| 6 | 98.5 | 1.5 | 0.089 | 25 | 15.00 | 4.3 |
| 7 | 98.0 | 2.0 | 0.120 | 24 | 15.00 | 5.0 |
| 8 | 97.5 | 2.5 | 0.150 | 20 | 15.00 | 6.0 |
| 9 | 97.0 | 3.0 | 0.177 | 15 | 15.00 | 7.4 |
| 10 | 100.0 | 0.0 | 0.0 | 50 | 5.0 | 1.0 |

[1]Polystyrene contains .05 weight percent zinc stearate and 0.04 weight percent polyethylene glycol.
[2]Haze based on 25 mil thickness.

It is evident from the test data that those blends having 0.03 to 0.177 weight percent of diene rubber have desirable slip angles in the range of 15 to 40, however, the haze level at 0.177 is greater than 6 hence an upper level of about 0.150 is preferred.

It is evident from Example 10, that polystyrene having no dispersed rubber present, has a slip angle greater than 50. The sheeting from this run blocked badly in roll form and in cut sheets giving it little utility as a commercially biaxially oriented polymeric sheet.

EXAMPLE 11

A styrene-acrylonitrile (SAN) polymer prepared by thermal mass polymerization of 76 parts of styrene and 24 parts of acrylonitrile and having an average molecular weight of 60,000 Staudinger and a grafted diene rubber polyblend having styreneacrylonitrile grafts and matrix phase prepared according to U.S. Pat. No. 3,509,237 were blended along with zinc stearate and polyethylene glycol. The blend was extruded and biaxially oriented to form a 10 mil film using processing step of Example 4. The SAN polymer contained 24 weight percent of acrylonitrile as did the grafted molecules on the diene rubber. The diene rubber is a stereospecific polybutadiene rubber already described and 14 parts were graft polymerized by mass suspension methods with 26 parts of acrylonitrile and 60 parts of styrene monomers giving a rubber particle size of about 1.0 microns and having a graft and occlusion level of 1 part to 1 part of rubber. The polyblend contained about 14% diene rubber. About 0.4 parts of the polyblend, 0.05 parts of zinc stearate, 0.04 parts of polyethylene glycol and 99.61 parts of SAN were blended and formed into a biaxially oriented sheet. The sheet produced had a slip angle of 25° as compared to a biaxially oriented sheet of styrene-acrylonitrile polymers not having the grafted dispersed diene rubber having a slip angle of 50°.

It will be appreciated that, while the embodiments of the present invention as shown and described herein are necessarily limited to a few forms of the present invention, many variations and modifications thereof are feasible and practical without departing from the spirit and scope of the present invention disclosed and claimed herein.

What is claimed is:

1. An improved transparent biaxially oriented polymeric sheet having attenuated blocking tendencies consisting essentially of:
   A. a polymeric material selected from the group consisting of:
      1. a polymer of at least one monovinylidene aromatic monomer and
      2. a copolymer of said monovinylidene aromatic monomer and acrylonitrile monomer wherein said nitrile monomer constitutes from about 0.1 to 80% by weight of said copolymer, wherein said improvement comprises: said polymeric material having dispersed therein an amount, sufficient to attenuate the blocking tendencies of said sheet of:
   B. a grafted diene rubber grafted with a monomer selected from the group consisting of monovinylidene aromatic and mixtures of monovinylidene aromatic and acrylonitrile, said grafted diene rubber being dispersed in said polymeric material of said sheet as grafted rubber particles having a weight average particle size diameter of about 0.5 to 5.0 microns, said particles having present said monomer as grafted and occluded polymer in an amount of from about 0.5 to 4 parts for each part of said rubber, said grafted and occluded polymer having substantially the same monomer composition and proportions as the polymeric material, said grafted diene rubber being present in said polymeric material in an amount such that the diene rubber moiety is present in an amount of from about 0.03 to 0.15 weight percent, providing said sheet with a slip angle of less than about 40 and a haze value of less than about 6.0.

2. A sheet of claim 1, wherein the polymeric material is a polymer of at least one monovinylidene aromatic monomer.

3. A sheet of claim 1, wherein the polymeric material is a copolymer of said monovinylidene aromatic monomer and said acrylonitrile monomer.

4. A sheet of claim 2, wherein said polymer has an average molecular weight of from about 40,000 to 100,000 Staudinger.

5. The sheet of claim 2, wherein said monovinylidene aromatic monomer is selected from the group consisting of styrene, aralkylstyrenes, alphalkylstyrenes, alphahalostyrenes, and arhalostyrenes and mixtures of the same.

6. The sheet of claim 2, wherein the monovinylidene aromatic monomer is styrene.

7. A sheet of claim 2, wherein the monovinylidene aromatic monomer is alphamethylstyrene.

8. The sheet of claim 2, wherein the monovinylidene aromatic monomers is monochlorostyrene.

9. A sheet of claim 2, wherein said diene rubber is selected from the group consisting of polybutadiene, copolymers of butadiene-styrene or butadiene-acrylonitrile wherein said polybutadiene rubber has a cis-isomer content of about 30 to 98% and a Tg range of from about −50° to −105° C. said butadiene copolymer rubbers having a Tg range of from about −20° to −70° C.

10. A sheet of claim 2, having a gauge of 1 to 25 mils.

11. A sheet of claim 2, having a haze value of less than 10.

12. A sheet of claim 3, wherein said monovinylidene aromatic monomer is selected from the group consisting of styrene, aralkylstyrenes, alphalkylstyrenes, alphahalostyrenes, and arhalostyrenes and mixtures of the same.

13. A sheet of claim 3, wherein the monovinylidene aromatic monomer is styrene.

14. A sheet of claim 3, wherein the monovinylidene aromatic monomer is alphamethylstyrene.

15. A sheet of claim 3, wherein the monovinylidene aromatic monomers is monochlorostyrene.

16. The sheet of claim 3, wherein said ethylenically unsaturated nitrile monomer is selected from the group consisting of acrylonitrile, methacrylonitrile, ethacrylonitrile and mixtures of the same.

17. The sheet of claim 3, wherein said ethylenically unsaturated nitrile monomer is acrylonitrile.

18. The sheet of claim 3, wherein the ethylenically unsaturated nitrile monomer is methacrylonitrile.

19. A sheet of claim 3, wherein the diene rubber moiety of the grafted diene rubber of (B) is present in an amount of at least about 0.03 weight percent based on the sheet.

20. A sheet of claim 3, wherein the diene rubber moiety of the grafted diene rubber of (B) is present in an amount of about 0.03 to 0.15 weight percent based on the sheet.

21. A sheet of claim 3, wherein said copolymer has an average molecular weight of from about 40,000 to 100,000 Staudinger.

22. A sheet of claim 3, wherein said grafted diene rubber is dispersed as rubber particles having a weight average particle size of about 0.1 to 5.0 microns.

23. A sheet of claim 3, wherein said diene rubber particles have said monomer present as grafted and occluded copolymer in an amount of about 0.5 to 4 parts for each part of rubber.

24. A sheet of claim 3, wherein said diene rubber is selected from the group consisting of polybutadiene, copolymers of butadiene-styrene or butadiene-acrylonitrile wherein said polybutadiene rubber has a cis-isomer content of about 30 to 98% and a Tg range of from about −50° to −105° C. said butadiene copolymer rubbers having a Tg range of from about −20° to −70° C.

25. A sheet of claim 3, having a gauge of 1 to 25 mils.

26. A sheet of claim 3, having a slip angle of less than 40.

27. A sheet of claim 3, having a haze value of less than 10.

28. A method for attenuating the blocking tendencies of a transparent biaxially oriented polymeric sheet comprising the steps of dispersing in
   A. a polymeric material consisting essentially of a material selected from the group consisting of:
      1. a polymer of at least one monovinylidiene aromatic monomer and
      2. a copolymer of said monovinylidene aromatic monomer and acrylonitrile monomer wherein said nitrile monomer constitutes from about 0.1 to 80% by weight of said copolymer, an amount sufficient to attenuate the blocking tendencies of said sheet of:
   B. a grafted diene rubber grafted with a monomer selected from the group consisting of monovinylidene aromatic and mixtures of monovinylidene aromatic and acrylonitrile, said grafted diene rubber being dispersed in said polymeric material of said sheet as grafted rubber particles having a weight average particle size diameter of about 0.5 to 5.0 microns, said particles having present said monomer as grafted and occluded polymer in an amount of from about 0.5 to 4 parts for each part of said rubber, said grafted and occluded polymer having substantially the same monomer composition and proportions as the polymeric material, said grafted diene rubber being present in said polymeric material in an amount such that the diene rubber moiety is present in an amount of from about 0.03 to 0.15 weight percent, providing said sheet with a slip angle of less than about 40 and a haze value of less than about 6.0.

29. A method of claim 28, wherein said polymeric material has an average molecular weight of from about 40,000 to 100,000 Staudinger.

30. A method of claim 28, wherein said polymer is polystyrene.

31. A method of claim 28, wherein said polymeric material is a copolymer of styrene and acrylonitrile.

* * * * *